April 21, 1959
K. GOLDSCHMIDT
2,883,468
CALLING LINE IDENTIFIER
Filed Dec. 30, 1954
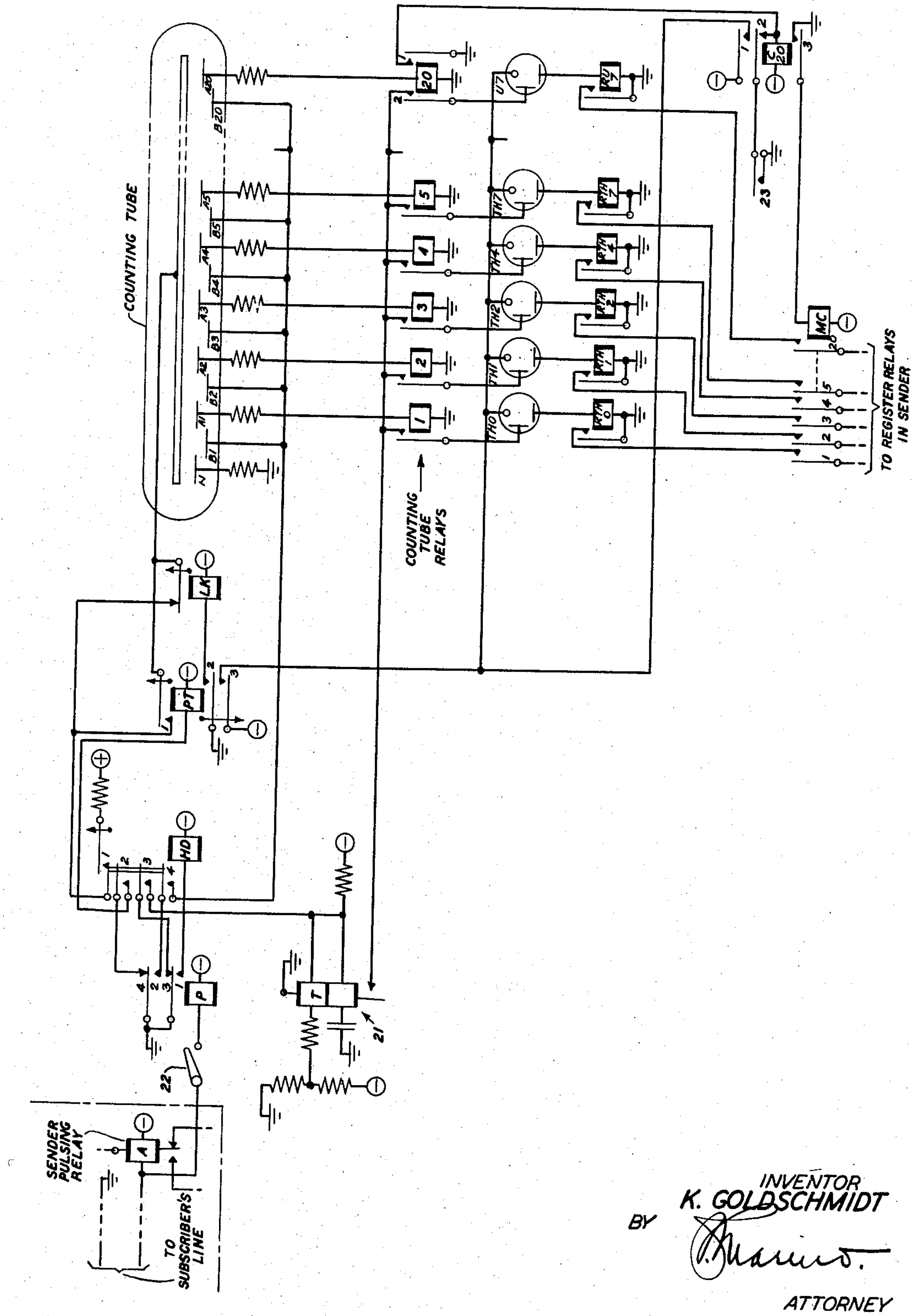
INVENTOR
K. GOLDSCHMIDT
BY
ATTORNEY // United States Patent Office 2,883,468 Patented Apr. 21, 1959

2,883,468

CALLING LINE IDENTIFIER

Karl Goldschmidt, New Providence, N.J., assignor to Bell Telephone Laboratories, Incorporated, New York, N.Y., a corporation of New York Application December 30, 1954, Serial No. 478,698

10 Claims. (Cl. 179—18)

This invention relates to a signal source identification system, and more particularly to such a system as adapted for application to a telephone system in which it is required to determine the identity of a calling subscriber's line.

In the telephone art an identifier is generally a device for providing an indication of the designation of a station, trunk or other unit. Identifiers are necessary in automatic switching of certain toll calls since automatic identification of the calling number is essential to proper billing for the call. As a result, identifiers have been used in various automatic switching devices including automatic ticketing systems, in which a record of subscriber dialed toll calls, including the printing of a ticket bearing the calling and called numbers and other billing data is automatically produced. Here, the identifier serves the purpose of determining the calling number, thus obviating a request for the same by the operator. In addition, on those calls for which operator assistance is required, it is possible through an identifier to display the calling number automatically. Here again, the necessity of challenging the calling party for his number by the operator, is avoided.

Existing identifiers, although completely operative, often suffer the disadvantage of unusual complexity, with the attendant burden of expense in production and maintenance.

It is therefore an object of this invention to produce a relatively simple and economical apparatus for securing calling number identification.

A further object of this invention is to provide a device for obtaining the identification of the calling line from signals generated by the calling subscriber's dial.

The present invention accomplishes these and other objects by utilizing a counting tube, control devices to step the ionization position in the counting tube, discriminating means for identifying long pulses from the subscriber's dial and register means to indicate the code designation of the calling subscriber's line.

A modified dial in the subscriber set, disclosed and described in my copending application Serial No. 478,697, filed December 30, 1954, is operated to transmit the calling number digits in the well-known two-out-of-five pulse code directly to the central office where it is received by the identifier which is an embodiment of this invention. The subscriber is required to make an extra pull on the dial, using an 11th hole as the final operation in dialing. This latter operation serves to transmit the calling number identification in two-out-of-five pulse code, in which the code elements are distinguished by the duration of the pulses. The long pulses indicate the two-out-of-five code indicative of the identity of the calling line. The subscriber's dialing mechanism is adapted to transmit twenty pulses which are comparable to four sets of two-out-of-five code designations. Thus, in a train of five pulses, if two short pulses are followed by two long pulses and one short pulse, the third and fourth pulses identify a digit. Since the third and fourth pulses are equivalent to the digits 2 and 4 in the two-out-of-five code, the decimal digit 6 is the digit being transmitted. For a detailed explanation of the two-out-of-five code, see "The Design of Switching Circuits" by Keister et al. published in 1951 by D. Van Nostrand Company.

As the pulses are received in the calling number identifier, a pulse repeating relay functions to step a counting tube one position for each pulse received. A timing relay operates to distinguish between the duration of the long and short pulses, whereby register tubes are energized from the counting tube by long pulses and not energized by short pulses. After the twenty pulses have been received and the counting tube has been stepped to the twentieth position, the register tubes will indicate in the two-out-of-five code, the designation of the calling subscriber's number. This information is then available for transmission to other units in the telephone system for printing the identity of the calling line, or for other purposes.

These and other features and objects of the invention will be readily understood from the following detailed description, appended claims and accompanying drawing in which:

A circuit embodying applicant's invention is shown with facilities for introducing the dial pulses generated by the dialing mechanism described in my copending application, above referred to.

The drawing shows a pulsing relay A, which is located in the sender at the central office. A relay P in the calling number identifier is connected to the input to relay A by means of switch 22 and also follows the line pulses from the calling subscriber dial. Slow release relay HD is adapted to operate when relay P operates and remains operated through the entire cycle of pulsing. A timing relay T, on the other hand, is adapted to operate when relay P is released. The operation of relay T, however, is effectuated only by a pulse of sufficient predetermined time duration inasmuch as it is equipped with a time delay operating circuit through its lower winding. In only those instances in which the pulse is of sufficient duration will relay T operate and engage its contacts. In all other instances the operating winding of relay T will be energized but the relay will not operate. Relays PT and LK are adapted to provide anode voltage and cathode voltage to the counting tube and to the register tubes TH0, TH1, etc. The counting tube is a cold cathode counting or stepping tube similar to that described in Patent 2,575,370, issued to M. A. Townsend on November 20, 1951, comprising a cathode N in which ionization is initiated, twenty cathodes B1–B20, and twenty cathodes A1–A20. All of the cathodes B1–B20, of which only part are shown, are connected to ground during a pulse period through the No. 4 contacts of relay HD and the No. 2 contacts of relay P. All the cathodes A1–A20, of which only part are shown, are severally and serially connected through corresponding counting tube relays 1–20 to ground.

As will be explained herein in the description of the operation, the contacts on the counting tube relays 1–20 function to connect ground through contacts on relay T to the starter anodes of the thousands digit register tubes TH0, TH1, TH2, TH4, TH7, etc. Twenty register tubes, five each for the thousands, hundreds, tens, and units digits, are provided, only six being shown in the drawing. The tube arrangements for the hundreds, tens and units digits (not shown, except for tube U7) are identical to those shown for the thousands digit. The cold cathode register tubes are operated in the two-out-of-five code to mark any pulse which is a "long" pulse, as indicated by operation of relay T. Serially connected to the main anodes of the cold cathode register tubes are the register relays RTH0, RTH1, RTH2, RTH4, RTH7, etc. Five register relays are each provided for the thousands, hundreds, tens and units digits of the calling number and are associated with the thousands, hundreds, tens and units cold cathode register tubes. Relay C20 and MC are adapted to operate after the twentieth pulse has been received. When multicontact relay MC is operated, it closes all of its associated contacts thereby extending ground from any of the operated register relays to the corresponding calling number register relays in the sender, as will be explained herein.

Having described the apparatus comprising the invention, its operation is as follows:

The calling number identifier embodying the present invention is connected by means of switch 22 when the identity of the calling subscriber is desired, to the calling line at the pulsing relay A in the sender. Relay P in the identifier follows the pulses from the calling subscribed dial over an obvious circuit. It is seen that when the identifier is initially connected to the line, relay P is operated. Relay HD subsequently operates through the No. 1 contacts of relay P. Preliminary make contacts 1 on relay HD complete a path from positive battery through the contacts of relay LK to the anode of the counting tube.

The characteristics of the counting tube are such that it will initially ionize at the N cathode. When the remainder of the contacts 2, 3 and 4 of relay HD are engaged, a path may be traced from ground through the No. 2 contacts of relay P, No. 4 contacts of relay HD, to the cathodes B1–B20 of the counting tube. This condition causes transference of the ionization from cathode N to cathode B1 in accordance with the operation of this genus of counting tube, as set forth in the above-mentioned patent to Townsend. When relay P releases at the beginning of the first pulse and the No. 2 contacts open, ground is removed from the B cathodes of the counting tube. Although the No. 1 contacts of relay P also disengage, interrupting the path to relay HD, this relay will not release as yet, since it is designed as a slow-release relay. As a result of ground being removed from the B1 cathode, the ionization in the counting tube transfers from the B1 cathode to the A1 cathode. Since relay P is now in the released position, a circuit may be traced from ground through the No. 4 contacts of relay P, No. 2 contacts of relay HD, through the winding of relay PT to negative battery, operating relay PT.

When relay PT operates, the voltage supplied to the anode of the counting tube may be traced from positive battery through the No. 1 contacts of relay HD, No. 1 contacts of relay PT, to the anode of the counting tube. Relay LK is operated through the No. 2 contacts of relay PT, disengaging the contacts of relay LK, but this operation is designed to take place after the No. 1 contacts of relay PT have engaged to insure continuity of anode voltage to the counting tube. Since the ionization of the counting tube is now centered at cathode A1, a circuit may be further traced through the cathode A1 and the winding of counting tube relay 1, to ground, operating said relay.

Relay T has been previously energized over a circuit which may be traced from ground through the No. 3 contacts of relay P, the No. 3 contacts of relay HD, through the operating winding of relay T to negative battery. An additional circuit may be traced from ground on the contacts of relay T to the staring anodes of the register tubes TH0, TH1, TH2, etc., if relay T has operated. It may be seen that relay T will operate if the pulse is sufficiently long, to overcome the delaying effect of network 21, thereby operating the contacts. In certain instances relay T will be energized but remain unoperated inasmuch as the pulse was insufficiently long to operate the relay.

For exemplary purposes, however, it may be assumed that the initial pulse being considered is of sufficient duration to operate relay T. As a consequence, a circuit may be traced from ground through the contacts of relay T, the contacts of counting tube relay 1, previously operated, to the starter anode of register tube TH0. Since the cathode of register tube TH0 is supplied with negative voltage over a circuit that may be traced from negative battery through the No. 3 contacts of relay PT to the cathode of tube TH0, register tube TH0 fires and operates its associated relay RTH0.

It may be seen therefore that the first pulse, having been a long pulse signifying an element in the two-out-of-five code, has resulted in a corresponding registration in the register relay RTH0. If the pulse had been of a duration insufficient to operate relay T, no circuit would have been available to afford a path to ground for the starter anode of tube TH0, as a result of which said tube would not have ionized and its associated relay would not have operated.

It may be noted here that relay HD, being a slow-release relay will not release during the interval between succeeding pulses. Likewise, relay PT is designed to remain operated during succeeding pulses.

In the manner described for cathode A1, the counting tube follows all succeeding incoming pulses. Each time relay P operates, the ionization location in the counting tube is advanced from an A cathode to the succeeding B cathode, e.g., from cathode A3 to cathode B4. Each time relay P releases, indicating a pulse, the ionization advances from a B cathode to the following A cathode e.g., from cathode B4 to cathode A4. As described above, the timing relay T serves to mark those pulses which are of "long" duration, and cause a two-out-of-five register tube to fire whenever a "long" pulse is received.

After twenty consecutive pulses have been received, cathode A20 is the center of ionization and a circuit may be traced from cathode A20 through the winding of counting tube relay 20, thereby operating the relay. An additional circuit may now be traced from ground through the No. 1 contacts of relay 20, winding of relay C20, to negative battery. Relay C20 then locks up over its No. 2 contacts and sender off-normal contacts 23 to ground. Relay C20, through its No. 3 contacts, operates multi-contact relay MC which extends the grounds from the contacts of those register relays RTH0, RTH1, RTH2, etc., which have been operated, to the calling number register relays in the sender, not shown. As a consequence, the registration of the calling subscriber number is transferred to a register in the sender, which then utilizes it in the performance of its functions.

It will be noted that at the conclusion of the twentieth pulse relay HD will release and subsequently relay PT will release. If no other provision were made to insure continuity of the negative voltage supply to the cathodes of the register tubes, the tubes previously ionized would be summarily extinguished. To offset this possibility, an alternate path is provided for the negative voltage supply to the cathodes of the register tubes, which may be traced from negative battery through the No. 1 contacts of relay C20, to the cathodes of the register tubes.

The identifier is designed to respond to pulse trains, comprising pulses of long and short duration in the two-out-of-five code. As explained in my copending application above referred to, the pulse trains signifying the identity of the calling subscriber's line in the two-out-of-five code are automatically generated when the 11th hole of the dial is pulled.

If for some reason the identifier is connected to the line during ordinary dial pulsing by the subscriber, means are provided to erase any registrations occasioned in the counting or register tubes by these pulses. If, for example, the counting tube has been stepped to the A5 ionization position as a result of receiving five pulses, relay PT will release during the interdigital interval thereby extinguishing the ionization in the counting tube. The N cathode again becomes the center of ionization when anode voltage is subsequently reapplied through the contacts of relay LK, upon its release. It also is apparent that when relay PT releases, the negative voltage supply to the cathodes of the register tubes is interrupted by the disengagement of the No. 3 contacts on relay PT. These erasures in the counting tube and register tubes will take place whenever the number of pulses received and counted by the counting tube are less than twenty pulses. Since the ordinary dial pulse registration comprises ten pulses or less, the erasing procedures explained above will apply and all registrations in the counting tube and cold cathode register tubes will be extinguished.

The above apparatus is arranged to receive and identify a four-digit code. As a consequence, it is not arranged to identify the calling office designation or the class of the calling line. However, the apparatus can be modified in conjunction with the modification of the dial mechanism supplying the pulses, to identify the calling office and the class, as well as the calling number, by providing for the generation and reception of additional trains of two-out-of-five pulses representing the desired information.

While I have illustrated my invention by a particular embodiment thereof, said invention is not limited in its application to the specific apparatus and particular arrangements herein disclosed. Various applications, modifications, and arrangements of the invention will readily occur to those skilled in the art.

The terms and expressions which I have employed in reference to the invention are used as terms of description and not of limitation, and I have no intention in the use of such terms and expressions, of excluding equivalents of the features shown and described, or parts thereof but, on the contrary, intend to include therein any and all equivalents, modifications and adaptations which may be employed without departing from the spirit of the invention.

What is claimed is:

1. A calling line identifier comprising means responsive to code pulses in conformity with a code expressing digits or characters, register means responsive to said code pulse responsive means to register the number of said code pulses, discriminating means responsive to said code pulse responsive means for indicating the time duration of said code pulses individually, and means jointly controlled by the operation of said discriminating means and said register means for indicating the code designation of the digits or characters represented by said pulses.

2. A calling line identifier comprising pulse repeating means responsive to long pulses and short pulses in conformity with a code designating digital values, register means responsive to said pulse repeating means for registering all of said pulses, discriminating means responsive to the operation of said pulse repeating means when repeating a long pulse, and means controlled by the operation of said discriminating means and said register means for indicating in code designation the digits represented by said pulses.

3. A calling station identifier comprising pulse repeating means responsive to pulses of different time duration in conformity with a code expressing digits or characters, a multicathode gas counting tube responsive to said pulse repeating means for registering all of said pulses, timing means responsive to said pulse repeating means when repeating pulses of predetermined duration, and means controlled by said timing means and said counting tube for indicating the code designation of the digits or characters represented by said pulses of different duration.

4. A system for automatic line identification comprising pulse repeating means responsive to long and short pulses in code pulse trains expressing digits or characters, timing means including a relay having a predetermined operating time responsive to said pulse repeating means when repeating a long pulse, a multicathode stepping tube responsive to each pulse within said trains, and means jointly controlled by said timing means and said counting tube for indicating the code designations of the digits or characters represented by said code pulse trains.

5. An automatic calling station identifier comprising a pulse repeating relay responsive to long and short pulses arranged in trains of five pulses, in conformity with a code wherein each train includes two long pulses, a multicathode gas counting tube responsive to each of said pulses, a timing relay responsive to said pulse repeating relay when repeating a long pulse, register tubes jointly controlled by said timing relay and said counting tube for indicating the code designation of the digits or characters represented by said pulse trains, multicontact relay means, and means responsive to the reception of the final pulse in the last train for operating said multicontact relay means to convey electrical indications of said code designations.

6. An automatic calling line identifier comprising a pulsing relay responsive to long and short pulses arranged in trains of five pulses in conformity with the two-out-of-five code, a counting tube responsive to the operation of said pulsing relay for counting the pulses within said trains, discriminating means responsive to said pulsing relay when repeating a pulse of predetermined duration, cold cathode register tubes responsive to said discriminating means and to said counting tube for indicating in two-out-of-five code designation the information represented by said pulse trains, means responsive to the reception of the final pulse in the last train for sustaining the operated condition of said register tubes after the conclusion of all pulsing, and additional means responsive to the reception of the final pulse in the last train for translating the two-out-of-five code registrations in said register tubes to electrical indications.

7. An automatic calling line identifier comprising a pulse repeating relay responsive to long and short pulses arranged in two-out-of-five code form, a multicathode gas counting tube responsive to all of said pulses, timing means responsive to said pulse repeating relay when repeating a pulse of long duration, counting tube relays associated with and responsive to the conductivity of said counting tube, cold cathode register tubes associated with and controlled by said counting tube relays and said timing means for indicating in two-out-of-five code designation the information represented by said long and short pulses, and means responsive to the reception of less than a predetermined number of pulses for extinguishing said cold cathode register tubes and resetting said counting tube to an initial ionization condition.

8. An automatic calling line identifier comprising a pulse repeating relay responsive to long and short pulses arranged in trains conforming to two-out-of-five code designations, said pulses comprising long and short pulses in trains of five pulses, each train including at least two long pulses, timing means responsive to said pulse repeating relay when repeating long pulses, a cold multicathode gas counting tube responsive to each pulse within said trains, counting tube relays associated with and responsive to the operation of said counting tube, cold cathode register tubes responsive to said counting tube relays and to said timing means for indicating in two-out-of-five code designations the information represented by said pulse trains, means responsive to a number of pulses less than the predetermined number for extinguishing the ionization in said register tubes and said counting tube ionization, means responsive to a final pulse in said last pulse train for maintaining ionization in said cold cathode register tubes, and additional means responsive to said final pulse in said last train for translating said two-out-of-five code designations in said register tubes to electrical indications.

9. An automatic calling line identifier comprising a pulse repeating relay responsive to twenty long and short pulses arranged in four trains of five pulses, each train conforming to two-out-of-five code designations, each of said trains including two long pulses and three short pulses, a timing relay responsive to said pulse repeating relay when repeating long pulses, a cold multicathode gas counting tube responsive to the operation of said pulse repeating relay for registering all of said pulses, said counting tube comprising an initial ionization cathode and forty additional cathodes, means responsive to said pulse repeating relay for concentrating the ionization in said counting tube at said initial ionization cathode, twenty counting tube relays individually associated with alternate ones of said forty additional cathodes, twenty cold cathode register tubes responsive to said counting tube relays and to said timing means for indicating in two-out-of-five code designations the information contained in said pulse trains, twenty register tube relays individually responsive to said cold cathode register tubes for providing electrical indications of the two-out-of-five code designations in said register tubes, a plurality of output conductors connected to the contacts of said register tube relays, relay means responsive to the reception of the final pulse by said counting tube for extending the electrical indications provided by said register tube relays to said output conductors, and additional means responsive to the reception of said final pulse in said counting tube for sustaining registration in said cold cathode register tubes after completion of pulsing.

10. A calling line identifier comprising a pulsing relay responsive to twenty long and short pulses in five pulse trains, each train including two long pulses and three short pulses, timing relay means responsive to the operation of said pulsing relay when said pulsing relay is responding to a long pulse, a forty-one cathode gas counting tube responsive to all of said pulses, means responsive to said pulsing relay for ionizing the gas in said counting tube at an initial ionization cathode, counting tube relays connected to twenty of said cathodes in said counting tube, twenty cold cathode register tubes jointly controlled by said counting tube relays and said timing relay for registering in two-out-of-five code designations the information contained in said pulse trains, twenty register tube relays individually associated with said register tubes for translating said code indications to electrical indications, relay means responsive to the reception of the twentieth pulse by said counting tube for maintaining registrations in said register tubes, a plurality of output conductors connected to said register tube relays, additional means responsive to the reception of the twentieth pulse in said counting tube for extending the electrical indications of said register tube relays to said plurality of output conductors, and means responsive to the reception of less than twenty pulses in said counting tube for extinguishing any registrations in said register tubes and resetting said counting tube to said initial ionization cathode.

References Cited in the file of this patent

UNITED STATES PATENTS

| | | |
|---|---|---|
| 2,306,822 | Holden | Dec. 29, 1942 |
| 2,708,690 | Mitchell | May 17, 1955 |